United States Patent
Jensen

(10) Patent No.: US 7,429,156 B2
(45) Date of Patent: Sep. 30, 2008

(54) METHOD FOR THE TRANSPORT OF A LONG WINDMILL WING AND A VEHICLE FOR THE TRANSPORT THEREOF

(75) Inventor: Jørgen E. Jensen, Vamdrup (DK)

(73) Assignee: Vamdrup Specialtransport ApS, Vamdrup (DK)

( * ) Notice: Subject to any disclaimer, the term of this patent is extended or adjusted under 35 U.S.C. 154(b) by 0 days.

(21) Appl. No.: 11/630,274

(22) PCT Filed: Jun. 28, 2005

(86) PCT No.: PCT/DK2005/000437

§ 371 (c)(1),
(2), (4) Date: Apr. 11, 2007

(87) PCT Pub. No.: WO2006/000230

PCT Pub. Date: Jan. 5, 2006

(65) Prior Publication Data

US 2007/0248431 A1    Oct. 25, 2007

(30) Foreign Application Priority Data

Jun. 29, 2004    (DK) .............................. 2004 01026

(51) Int. Cl.
*B60P 7/00* (2006.01)

(52) U.S. Cl. ......................................... 410/45; 410/44

(58) Field of Classification Search .................. 410/44, 410/45, 53; 280/404
See application file for complete search history.

(56) References Cited

U.S. PATENT DOCUMENTS

| 2,903,274 | A | * | 9/1959 | Leonard, Jr. ................. 410/45 |
| 4,750,785 | A | | 6/1988 | Helton |
| 2006/0144741 | A1 | | 7/2006 | Wobben |

FOREIGN PATENT DOCUMENTS

| JP | 2002059776 | 2/2002 |
| WO | 2004041589 | 5/2004 |

* cited by examiner

*Primary Examiner*—Stephen Gordon
(74) *Attorney, Agent, or Firm*—Dykema Gossett PLLC

(57) ABSTRACT

In a method and a vehicle for the transport of a long windmill wing (2), the windmill wing is suspended at its one end on a hydraulic system (4, 11), which is adjustable in the height and is arranged rotatably on a tractive vehicle (3), and is secured at its opposite end to a non-tractive vehicle (5) which has a rotatable and height-adjustable carrier arrangement. Hereby, the distance between the lowermost edge of the windmill wing and the road surface may be adjusted in a great range, which is advantageous during transport where the windmill wing (2) is to be moved through viaducts or is to negotiate a road bend where a sign may be placed at a corner. Thus, a vehicle is achieved which may be used for the transport of very long windmill wings (2), where the manoeuvrability is optimum under various conditions.

7 Claims, 3 Drawing Sheets

METHOD FOR THE TRANSPORT OF A LONG WINDMILL WING AND A VEHICLE FOR THE TRANSPORT THEREOF

BACKGROUND OF THE INVENTION

1. Field of the Invention

The invention relates to a method for the transport of a long windmill wing, wherein the windmill wing is transported on a vehicle, and wherein the windmill wing is secured at one end to a tractive vehicle and at an opposite end to a non-tractive vehicle. The invention moreover relates to a vehicle for the transport of a long windmill wing, the vehicle being composed of a tractive vehicle to which one end of the windmill wing is secured, and a non-tractive vehicle to which the other end of the windmill wing is secured.

2. The Prior Art

In the production of energy in the form of electricity, ever greater demands are made by politicians and citizens in general with respect to replacing the fossil fuels with alternative renewable sources of energy, such as biogas systems, wave systems and windmill energy.

Windmill energy in particular has obtained an ever more prominent position in recent years, as it has been developed such that not inconsiderable amounts of energy can be produced by ever more effective windmills.

The greater efficiency of the windmills has been achieved technologically on the basis of the development of new materials having mechanical properties which make it possible today to manufacture windmill wings with a length of up to more than 60 metres and with a weight of about 18 tons.

Within a few years it will presumably be possible to manufacture windmill wings which have a length of between 80 and 100 metres.

When such large windmill wings are to be transported from the factory to the installation site, long special vehicles have been used till now where the windmill wing has rested on a long metal connection profile which is connected between the tractive part of a vehicle and a wheeled platform at the opposite end of the vehicle.

Such a vehicle may typically have a weight of the order of 35-40 tons. When the weight of the windmill wing is added, the total weight is of the order of 53-58 tons, which gives a considerable axle load on the vehicle which transports the windmill wing.

As the distance of the connection profile to the surface of the ground is very small, it may of course be difficult to manoeuvre the vehicle round corners if road signs or differences in level, e.g., are present at the corners.

WO 03/057528 A1 discloses a vehicle for the transport of a windmill wing, where the windmill wing is suspended between a tractive and a non-tractive vehicle.

As will be known, a windmill wing is configured as a partially flat structure which may have a thickness of 3.5-4.5 metres at its thick place at the root of the windmill wing, and a width which may be 4.5-5.5 metres at its widest place.

The suspension according to the WO publication is configured such that the windmill wing may be rotated about its longitudinal axis so that it may assume a "high" as well as a "wide" position, which means that if the windmill wing is to be moved through a viaduct having a height which is smaller than the width of the windmill wing, the windmill wing may be rotated about its longitudinal axis and thus be placed with its faces in a position such that the normal of the faces is perpendicular to the road. The windmill wing will hereby assume a position where the distance to the road surface is greatest.

Thus, in the known structure, it is the dimensions of the windmill which decide how high or how low the lowermost part of the windmill wing may be placed above a road, as the highest level means that the windmill wing must assume the widest position on the road, while the lowest level is achieved when the windmill wing stands up.

Accordingly, an object of the invention is to provide a method wherein the distance between the lowest part of the windmill wing and the surface of the road may be adjusted independently of the orientation of the windmill wing, and in a range which is greater than is possible in the known structure, and such that the distance between the lowest part of the windmill wing and the road surface may be adjusted without changing the position of the windmill wing on the vehicle.

SUMMARY OF THE INVENTION

The object of the invention is achieved by a method wherein the windmill wing is secured to the tractive vehicle by mounting a holding frame at one end of the windmill wing, the holding frame being coupled to a hydraulic system which is arranged on the tractive vehicle, the hydraulic system raising and lowering the holding frame with the windmill wing, such that the angle between the carrier member and the cylinder housing becomes more or less acute.

The distance between the lowest parts of the windmill wing and the road surface may be adjusted in this manner, without this having as a result that space is occupied transversely to the road surface, and in a greater range than that conditioned by the dimensions of the windmill wing.

Thus, the distance may be adjusted in such a manner that the lower side of the windmill wing is very close to the road surface near the tractive vehicle, or may be adjusted very high if the windmill wing, e.g. in a bend, is to pass a road sign or other obstacle.

As mentioned, the invention also relates to a vehicle provided with a hydraulic system comprising a cylinder housing and a carrier member, which hydraulic system is arranged on a bracket provided on the tractive vehicle, and the hydraulic system is adapted to raise or lower the windmill wing, such that the angle between the carrier member and the cylinder housing becomes more or less acute.

Hereby, it is possible during transport to adjust the height of the distance of the windmill wing from the road surface in a great range, and without it being necessary to rotate the windmill wing about its longitudinal axis, which can generally be a risky operation because of the inevitable forces that are generated during such a rotating movement.

To improve the manoeuvrability of the vehicle additionally, it is an advantage if the hydraulic system is arranged rotatably about an axis perpendicular to the road on which the vehicle is manoeuvered, thereby retaining the stability of the ball turntable.

For easy coupling of the tractive vehicle to the windmill wing it is an advantage if the hydraulic system includes coupling means in the form of posts for coupling to a holding frame which is mounted at one end of the windmill wing. The manufactured windmill wings may hereby rapidly be made ready for transport merely by mounting the holding frame on one end of the windmill wing.

Further, it is advantageous if the non-tractive vehicle is constructed as a platform on which a carrier arrangement is rotatably arranged, and the carrier arrangement is adjustable in height, as control of the height of the rearmost part of the windmill wing around corners with possible obstacles, such as road signs, may be effected.

For good mechanical retention of the rearmost part of the windmill wing, it is an advantage if the carrier arrangement is constructed as a support which comprises holding profiles in the form of frames for holding the opposite end of the windmill wing and thus fixes the windmill wing.

In order to be able to steer the overall vehicle, it is additionally advantageous if the non-tractive vehicle is connected hydraulically and electrically to the tractive vehicle.

The invention will now be explained more fully with reference to the drawings.

BRIEF DESCRIPTION OF THE DRAWINGS

FIG. 5 shows the root end of a windmill wing with mounted holding frame, while

DETAILED DESCRIPTION OF THE PREFERRED EMBODIMENT

Figure 1:
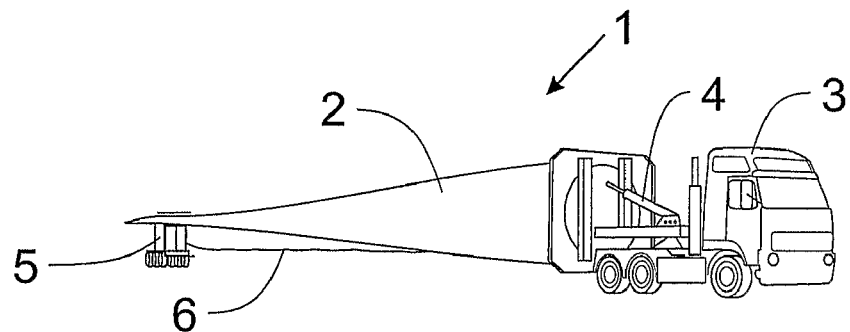
FIG. 1 shows a vehicle according to the invention with mounted windmill wing.
Figure 2:
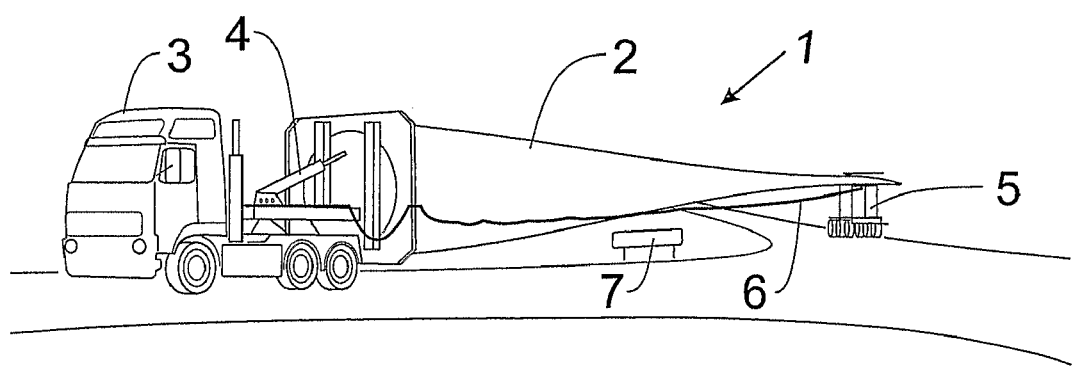
FIG. 2 shows the vehicle of FIG. 1 during turning.

In FIGS. 1 and 2, the numeral 1 generally designates a vehicle according to the invention. The vehicle consists of a tractive vehicle 3 and a non-tractive vehicle 5. A windmill wing 2 is suspended between the tractive vehicle 3 and the non-tractive vehicle 5, as will be explained below. As will be seen, the tractive vehicle 3 and the non-tractive vehicle 5 are connected with each other only via the windmill wing 2 and hydraulic/electrical connections, which are shown at 6.

In FIG. 1, the vehicle is shown on a straight stretch of road, while in FIG. 2 it is shown during turning, and, as will be seen, the windmill wing 2 passes over a sign 7.

Figure 3:
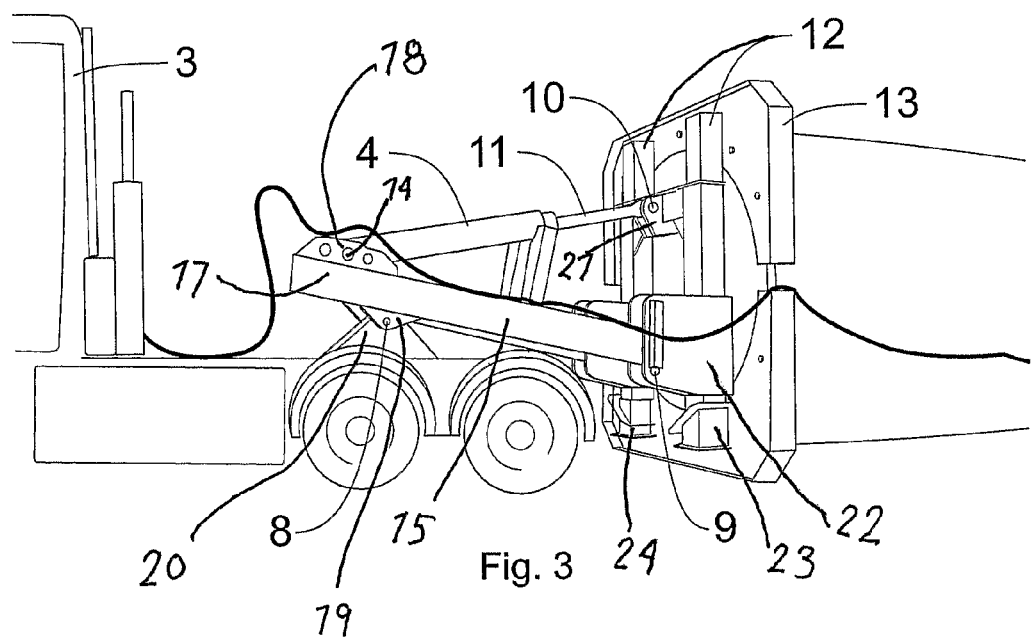
FIG. 3 shows the tractive vehicle where the windmill wing has just been mounted.
Figure 4:
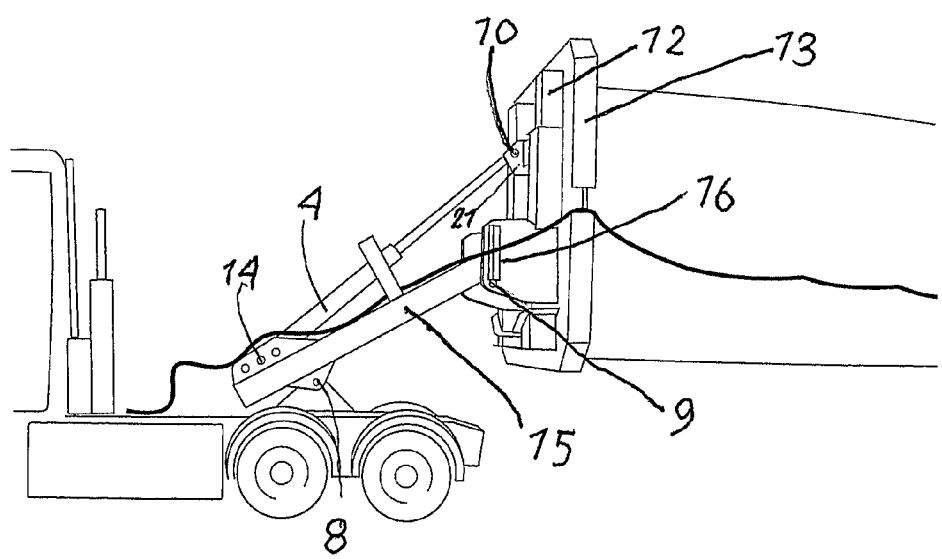
FIG. 4 shows the tractive vehicle of FIG. 3, but with raised windmill wing made ready for transport.

With reference now to FIG. 3 and FIG. 4, it will be explained how the windmill wing is secured to the tractive vehicle.

The tractive vehicle rotatably mounts a hydraulic system which is formed by a cylinder housing 4 in which a piston on a piston rod 11 may be moved in and out. The piston rod is secured to a pivot 10 on a bracket 21 which is fixed between two posts 12, while the cylinder housing 4 is secured to a pivot 14 on a bracket 18 which is in turn connected with a carrier member 15.

Via a bracket 19, the carrier member 15 is secured at its one end rotatably about a pivot 8 on a bracket 20, resting on a ball turntable on the tractive vehicle. The opposite end of the carrier member 15 is connected with a pivot 9 on a holding part 22 which is arranged in extension of the posts 12.

At the bottom, the two posts 12 are inserted into the holding parts 23, 24 on a holding frame 13 which is secured to the windmill wing 2.

The hydraulic system operates in the following manner:

When pressure is supplied to the cylinder housing 4 from the position shown in FIG. 3, the holding frame 13 with the windmill wing 2 will be pulled upwards to the position shown in FIG. 4, as the carrier member prevents the frame from being moved rearwards during the travel of the piston rod out of the cylinder housing 4. As will be seen, the angle between the carrier frame 15 and the cylinder housing 4 has become more acute.

When the windmill wing 2 on the frame 13 is to be lowered, the process is repeated in the reverse order.

Figure 5:
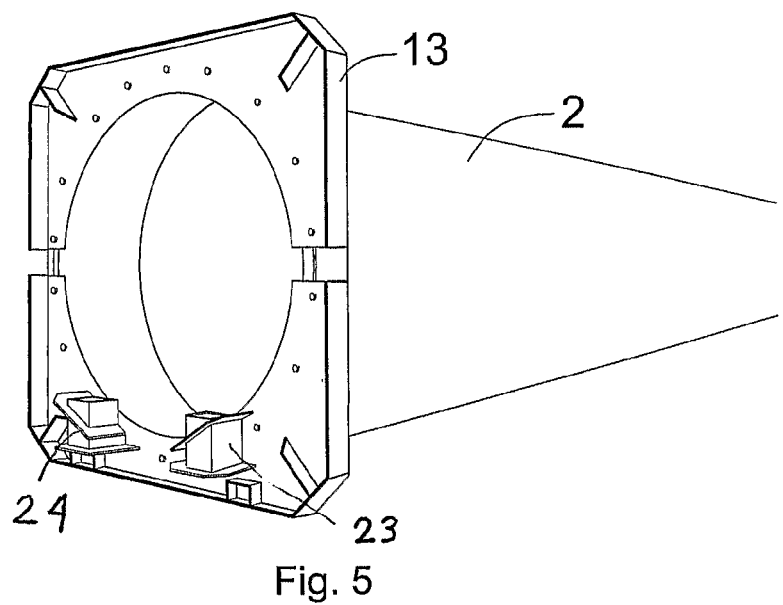

FIG. 5 shows the windmill wing 2 with mounted frame 13 and the holding parts 23, 24 for receiving the posts 12 on the hydraulic system. As will be appreciated, it is relatively easy to make a windmill wing ready for transport, since just the bracket 13 is to be mounted on the windmill wing.

Figure 6:
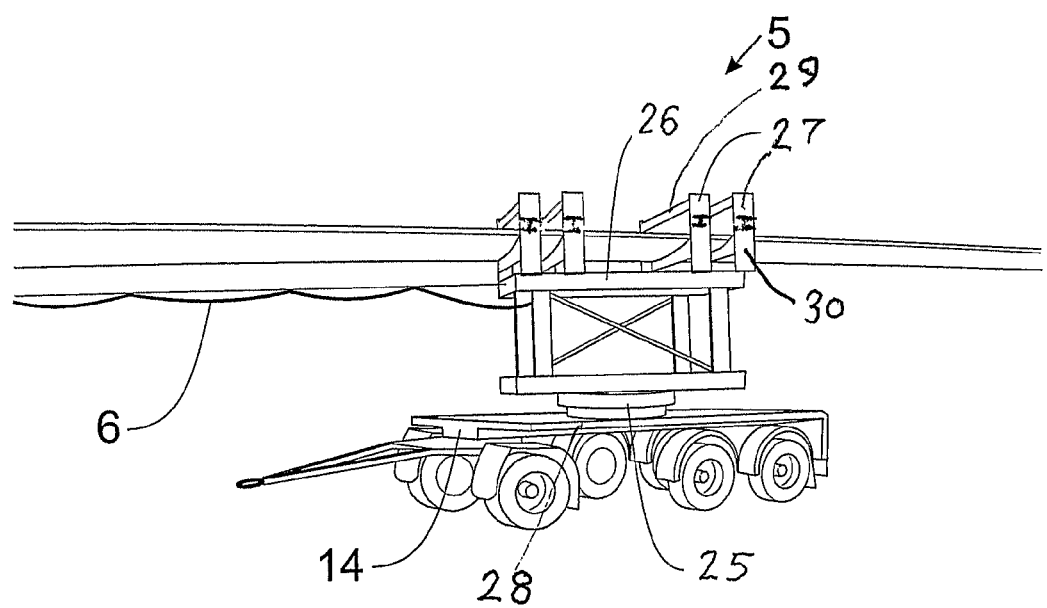
FIG. 6 shows the non-tractive vehicle with mounted windmill wing fixed in holding profiles.

With reference now to FIG. 6, which shows how the non-tractive vehicle 5 is constructed, carrier arrangement 26 is secured on a rotatable part 25 on a platform. The carrier arrangement 26 being in the form of a support composed of a plurality of profiles which are terminated at the top by fixing frames 27, which may be fixed around the rear end of the windmill wing, in that upper transverse rods 29 may be moved in a vertical direction and be fixed in vertical rods 30.

The invention claimed is:

1. A vehicle for the transport of a long windmill wing, said vehicle being formed by a tractive vehicle to which a first end of the windmill wing is secured, and a non-tractive vehicle to which a second end of the windmill wing is secured, wherein the tractive vehicle is provided with a hydraulic system comprising a cylinder housing and a carrier member, which hydraulic system is arranged on a bracket provided on the tractive vehicle, and the hydraulic system raises or lowers the windmill wing, such that an angle between the carrier member and the cylinder housing becomes more or less acute.

2. A vehicle according to claim 1, wherein the hydraulic system is mounted rotatably on an axis perpendicular to a road on which the vehicle is manoeuvered, and disposed on a ball turntable.

3. A vehicle according to claim 1, wherein the hydraulic system comprises coupling means in the form of posts for coupling to a holding frame which is mounted on the first end of the windmill wing.

4. A vehicle according to claim 1, wherein the non-tractive vehicle includes a platform on which a carrier arrangement for fixing the windmill wing is rotatably arranged.

5. A vehicle according to claim 4, wherein the carrier arrangement is adjustable in the height.

6. A vehicle according to claim 4, wherein the carrier arrangement is constructed as a support comprising holding profiles in the form of frames for holding the second end of the windmill wing.

7. A vehicle according to claim 1, wherein the non-tractive vehicle is connected hydraulically and electrically to the tractive vehicle.

* * * * *